United States Patent
Fitzer et al.

(10) Patent No.: US 11,126,411 B2
(45) Date of Patent: Sep. 21, 2021

(54) DASHBOARD USER INTERFACE FOR DATA DRIVEN APPLICATIONS

(71) Applicant: SAP SE, Walldorf (DE)

(72) Inventors: Joachim Fitzer, Frankfurt (DE); Eduardo Berlitz, Porto Alegre (BR); Eduardo Carvalho, Rio de Janeiro (BR); Alexandre Faltz, Porto Alegre (BR); Reinhold Kautzleben, Karlsruhe (DE); Willian Mendes, São Paulo (BR)

(73) Assignee: SAP SE, Walldorf (DE)

( * ) Notice: Subject to any disclaimer, the term of this patent is extended or adjusted under 35 U.S.C. 154(b) by 20 days.

(21) Appl. No.: 16/219,009

(22) Filed: Dec. 13, 2018

(65) Prior Publication Data

US 2020/0192641 A1 Jun. 18, 2020

(51) Int. Cl.
| | |
|---|---|
| *G06F 8/34* | (2018.01) |
| *G06F 8/36* | (2018.01) |
| *G06F 8/38* | (2018.01) |
| *G06F 9/451* | (2018.01) |
| *G06F 16/25* | (2019.01) |
| *G06F 16/901* | (2019.01) |

(52) U.S. Cl.
CPC ............... *G06F 8/38* (2013.01); *G06F 8/34* (2013.01); *G06F 8/36* (2013.01); *G06F 9/451* (2018.02); *G06F 16/252* (2019.01); *G06F 16/9024* (2019.01)

(58) Field of Classification Search
CPC ..... G06F 8/38; G06F 8/34; G06F 8/36; G06F 9/451; G06F 16/252; G06F 16/9024
See application file for complete search history.

(56) References Cited

U.S. PATENT DOCUMENTS

| | | | | |
|---|---|---|---|---|
| 5,481,741 A | * | 1/1996 | McKaskle | G06T 1/20 345/522 |
| 5,506,952 A | * | 4/1996 | Choy | G06F 8/33 715/763 |
| 5,826,086 A | * | 10/1998 | Arima | G06F 8/10 717/105 |
| 5,903,455 A | * | 5/1999 | Sharpe, Jr. | G05B 19/0423 700/83 |

(Continued)

FOREIGN PATENT DOCUMENTS

WO WO-2016036824 A1 * 3/2016 ............... G06F 8/34

OTHER PUBLICATIONS

"LabVIEW Environment Basics—National Instruments", published to web on May 22, 2010, retrieved on Jun. 8, 2020 from https://www.ni.com/getting-started/labview-basics/environment (Year: 2010).*

(Continued)

*Primary Examiner* — Shourjo Dasgupta
(74) *Attorney, Agent, or Firm* — Sterne, Kessler, Goldstein & Fox P.L.L.C.

(57) ABSTRACT

Disclosed herein are system, method, and computer program product embodiments for providing a dashboard user interface design and integration system. An embodiment operates by receiving a request to generate an interface associated with a data source and establishing a connection with the data source to receive data from the data source. An indication of a component to be displayed on the interface is received and the interface is generated. The interface includes the component and is coupled to the data source.

20 Claims, 7 Drawing Sheets

(56) References Cited

U.S. PATENT DOCUMENTS

| | | | | |
|---|---|---|---|---|
| 5,980,096 | A * | 11/1999 | Thalhammer-Reyero | G05B 17/02 |
| 6,272,672 | B1 * | 8/2001 | Conway | G06F 9/452 |
| | | | | 717/107 |
| 7,185,286 | B2 * | 2/2007 | Zondervan | G06Q 10/107 |
| | | | | 715/762 |
| 7,533,347 | B2 * | 5/2009 | Santori | G06F 8/34 |
| | | | | 715/762 |
| 7,565,280 | B2 * | 7/2009 | Moriat | G06F 30/331 |
| | | | | 703/22 |
| 7,844,911 | B2 * | 11/2010 | Austin | G06F 3/0481 |
| | | | | 715/763 |
| 7,934,194 | B2 * | 4/2011 | Kinnucan, Jr. | G06F 8/34 |
| | | | | 717/109 |
| 8,205,161 | B2 * | 6/2012 | King | G06F 9/542 |
| | | | | 703/13 |
| 9,043,716 | B2 * | 5/2015 | Jundt | G05B 19/0426 |
| | | | | 715/769 |
| 9,563,411 | B2 * | 2/2017 | Roberts | G06F 11/3604 |
| 9,762,659 | B2 * | 9/2017 | Koska | G05B 19/0423 |
| 9,811,233 | B2 * | 11/2017 | Abaya | G06F 8/38 |
| 10,089,635 | B1 * | 10/2018 | Broxton | G06Q 30/02 |
| 10,386,394 | B2 * | 8/2019 | Eibl | G06F 8/34 |
| 10,802,945 | B2 * | 10/2020 | Rozenberg | G06F 8/71 |
| 2002/0059293 | A1 * | 5/2002 | Hirsch | G06F 16/289 |
| 2002/0070965 | A1 * | 6/2002 | Austin | G06F 8/38 |
| | | | | 715/762 |
| 2002/0089541 | A1 * | 7/2002 | Orbanes | G06F 8/34 |
| | | | | 715/764 |
| 2003/0037322 | A1 * | 2/2003 | Kodosky | G06F 3/04817 |
| | | | | 717/162 |
| 2003/0058280 | A1 * | 3/2003 | Molinari | G01R 13/345 |
| | | | | 715/771 |
| 2003/0107595 | A1 * | 6/2003 | Ciolfi | G06F 8/34 |
| | | | | 715/762 |
| 2003/0132965 | A1 * | 7/2003 | Santori | G06F 9/54 |
| | | | | 715/763 |
| 2003/0154443 | A1 * | 8/2003 | Papierniak | G06T 11/206 |
| | | | | 715/211 |
| 2003/0193502 | A1 | 10/2003 | Patel et al. | |
| 2004/0056908 | A1 * | 3/2004 | Bjornson | G06F 8/34 |
| | | | | 717/115 |
| 2004/0216044 | A1 * | 10/2004 | Martin | G06F 8/51 |
| | | | | 715/273 |
| 2004/0225745 | A1 | 11/2004 | Carroll et al. | |
| 2004/0225763 | A1 | 11/2004 | Carroll et al. | |
| 2004/0233237 | A1 * | 11/2004 | Randow | G06F 8/34 |
| | | | | 715/763 |
| 2005/0015588 | A1 | 1/2005 | Lin et al. | |
| 2005/0097561 | A1 * | 5/2005 | Schumacher | G06F 8/10 |
| | | | | 718/106 |
| 2007/0022137 | A1 | 1/2007 | Scarboro | |
| 2007/0276689 | A1 * | 11/2007 | Slone | G06F 8/38 |
| | | | | 717/109 |
| 2008/0229222 | A1 * | 9/2008 | Kake | G06F 3/0481 |
| | | | | 715/764 |
| 2008/0229223 | A1 * | 9/2008 | Kake | G06F 3/0481 |
| | | | | 715/764 |
| 2008/0243711 | A1 * | 10/2008 | Aymeloglu | G06Q 40/00 |
| | | | | 705/36 R |
| 2011/0296298 | A1 * | 12/2011 | Ahuja | G06F 16/972 |
| | | | | 715/248 |
| 2012/0011458 | A1 * | 1/2012 | Xia | G06F 3/04847 |
| | | | | 715/771 |
| 2012/0041990 | A1 * | 2/2012 | Kreindlina | G06F 16/248 |
| | | | | 707/805 |
| 2012/0272186 | A1 * | 10/2012 | Kraut | G06F 3/04842 |
| | | | | 715/810 |
| 2013/0097592 | A1 * | 4/2013 | Simitsis | G06Q 10/0633 |
| | | | | 717/156 |
| 2013/0159468 | A1 | 6/2013 | Kusterer et al. | |
| 2013/0339831 | A1 * | 12/2013 | Gulanikar | G06Q 10/063114 |
| | | | | 715/210 |
| 2014/0025632 | A1 | 1/2014 | Celaya et al. | |
| 2014/0244623 | A1 * | 8/2014 | King | H04L 67/42 |
| | | | | 707/722 |
| 2014/0282227 | A1 * | 9/2014 | Nixon | G06F 9/44505 |
| | | | | 715/786 |
| 2015/0235405 | A1 | 8/2015 | Leppanen et al. | |
| 2015/0262396 | A1 * | 9/2015 | Devarajan | G06F 3/0486 |
| | | | | 345/440.1 |
| 2016/0041815 | A1 * | 2/2016 | Bhagat | G06F 8/36 |
| | | | | 717/107 |
| 2016/0148326 | A1 | 5/2016 | Lippow et al. | |
| 2016/0188302 | A1 * | 6/2016 | Fredrick | G06F 8/34 |
| | | | | 717/107 |
| 2016/0248888 | A1 * | 8/2016 | King | G06F 16/958 |
| 2017/0052766 | A1 * | 2/2017 | Garipov | G06F 16/2291 |
| 2017/0154088 | A1 * | 6/2017 | Sherman | G06F 16/212 |
| 2017/0154089 | A1 * | 6/2017 | Sherman | G06F 16/26 |
| 2017/0315713 | A1 * | 11/2017 | Pennell | G06F 3/0486 |
| 2017/0329786 | A1 * | 11/2017 | Chow | G06F 16/9535 |
| 2017/0344384 | A1 | 11/2017 | Wadley et al. | |
| 2019/0108272 | A1 * | 4/2019 | Talbot | G06F 3/04847 |
| 2019/0179829 | A1 * | 6/2019 | Nadler | G06T 11/206 |
| 2019/0384653 | A1 * | 12/2019 | Zolotow | G06F 9/5083 |
| 2020/0050533 | A1 * | 2/2020 | Nanjundappa | G06F 11/3684 |

OTHER PUBLICATIONS

"Parameterize your data source!", published on Nov. 15, 2018 to https://data-marc.com/2018/11/15/parameterize-your-data-source/, retrieved on May 17, 2021. (Year: 2018).*

"Creating Data Flows", published on Oct. 19, 2016 to https://docs.oracle.com/en/cloud/paas/bi-cloud/bilug/create-data-flow.html, retrieved on May 17, 2021. (Year: 2016).*

"Data Flow", published on Mar. 14, 2017 to https://docs.microsoft.com/en-us/sql/integration-services/data-flow/data-flow?view=sql-server-ver15, retrieved on May 17, 2021. (Year: 2017).*

Various authors as listed, "Spring Cloud Data Flow Reference Guide", published on Sep. 15, 2015 to https://docs.spring.io/spring-cloud-dataflow/docs/1.0.RELEASE/reference/htmlsingle/, retrieved on May 17, 2021. (Year: 2015).*

"Set the Properties of a Data Flow Component", published on Mar. 14, 2017 to https://docs.microsoft.com/en-us/sql/integration-services/data-flow/set-the-properties-of-a-data-flow-component?view=sql-server-ver15, retrieved on May 17, 2021. (Year: 2017).*

* cited by examiner

DASHBOARD USER INTERFACE FOR DATA DRIVEN APPLICATIONS

BACKGROUND

Designing and generating user interfaces is typically difficult and requires deep knowledge of programming languages, among other things. For example, a programmer needs to have knowledge of different platforms, frameworks, and programming languages to design a user interface. Also, the programmer may need to generate different user interfaces for different systems and devices. These technical challenges often waste valuable time and human and computing resources.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digits) of a reference number identifies the drawing in which the reference number first appears.

DETAILED DESCRIPTION

Provided herein are system, apparatus, device, method and/or computer program product embodiments, and/or combinations and sub-combinations thereof, for providing functionality for providing a dashboard user interface design and integration system.

Figure 1:
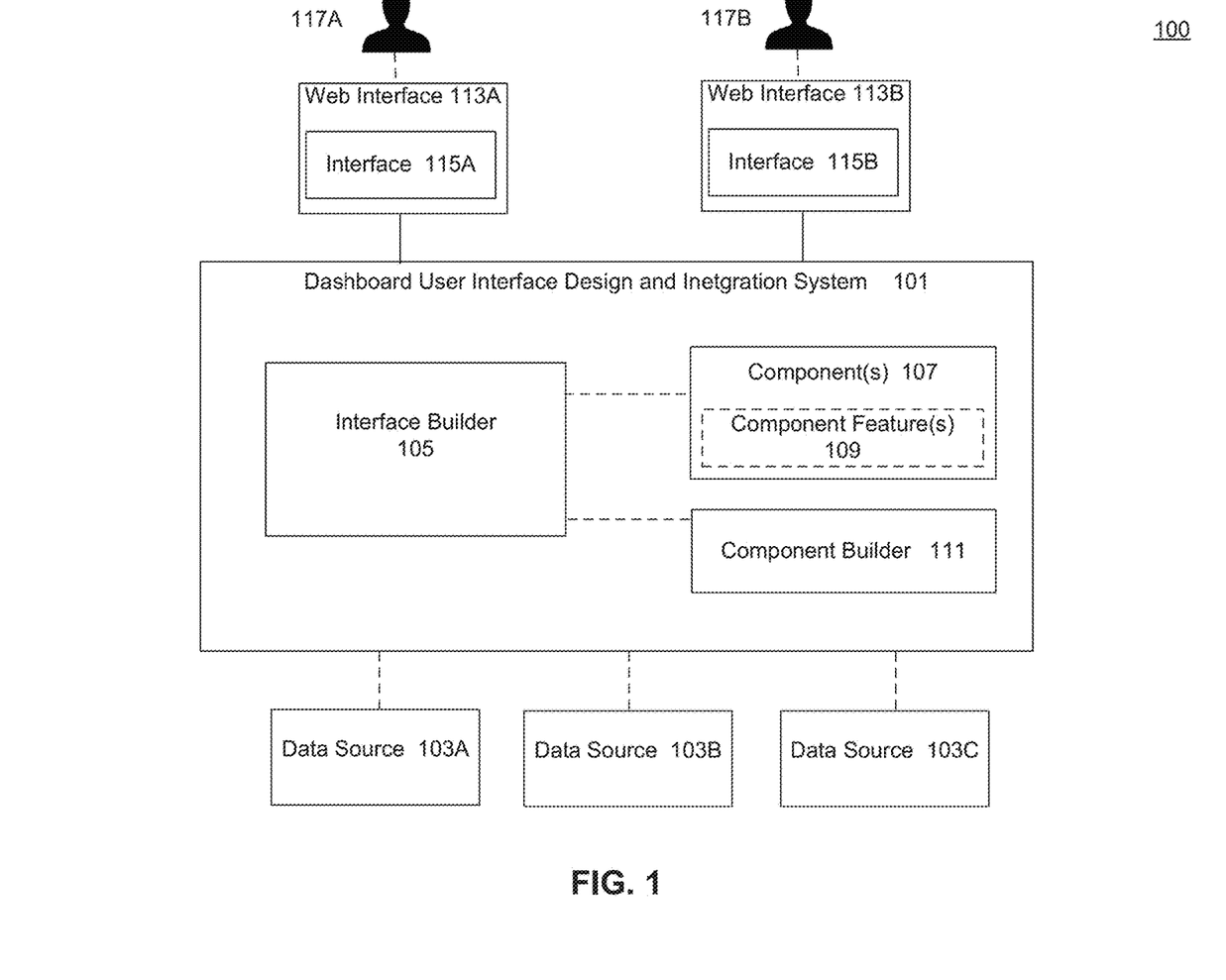
FIG. 1 is a block diagram illustrating example functionality for providing a dashboard user interface design and integration system, according to some embodiments.

FIG. 1 is a block diagram 100 illustrating example functionality for providing a dashboard user interface design and integration system, according to some embodiments. A dashboard user interface design and integration system 101 may provide a platform for a programmer, a developer, an administrator, or other users to develop data driven user interfaces fast, efficiently and conveniently. For example, dashboard user interface design and integration system 101 enables a user to design and generate an interface specific to the user's needs and requirements, where the interface can access and use data from one or more data sources that are local to the user or are provided in a distributed manner. In some examples, dashboard user interface design and integration system 101 enables the user to design and generate the interface embedded with a graph associated with the data provided from the data sources.

In an embodiment, a user 117A may use web interface 113A to access dashboard user interface design and integration system 101 (referred herein as design and integration system 101) to design and generate interface 115A, User 117A may use interface 115A to monitor or manipulate data from, for example, data source 103A. Design and integration system 101 enables user 117A to design and generate interface 115A specific to data source 103A, specific to user 117A's requirements, or a combination thereof. Also, design and integration system 101 enables user 117A to design and generate interface 115A fast and conveniently and without, for example, a need to have a deep knowledge of programming languages.

Web interface 113 may include any document, program, or application that is executable by or configured for display within a web browser. In an embodiment, web interface 113 may include a webpage such as a hypertext markup language MIMI) or other markup language document. Web interface 113 may also execute or reference non-markup language objects or functions, such as JavaScript® functions, JavaScript® is an example technology that enables webpage pages to be interactive, and may support both event-driven functionality and object-oriented programming, and this disclosure is directed to other technologies that provide similar functionality.

Each web interface 113 may have its own unique format or look and feel, or may have its own component(s). In an embodiment, web interfaces 113A-B may be different webpages across one or more websites that use or access at least a portion of data from data sources 103A-C. Web interfaces 113 may be referring to instances of a particular webpage. For example, a designer may program or design a webpage. The webpage may then be made available (on one or more servers) to multiple user devices or programs for simultaneous access, whereby each access may obtain its own copy or instance of the webpage.

Data source 103 may include any source of data. The data generated by data source 103 may be monitored by user 117 (e.g., manually monitored). Additionally or alternatively, the data generated by data source 103 may be monitored automatically by a data monitoring system (not shown). Depending on the monitoring processes, and based on the monitored data, control mechanisms can be performed by the manual and/or automatic monitoring systems. In one embodiment, data source 103 can include one or more sensors used in factories, motor vehicles, airplanes, office buildings, schools, etc., used to collect different types of data and information. In another embodiment, data source 103 may include or generate human resources information of an organization. In some examples, data source 103 can include or generate information associated with goods in a chain of commerce. It is noted that embodiments of this disclosure are not limited to these examples, and data source 103 can include any source of data.

In an embodiment, design and integration system 101 may include an interface builder 105, component(s) 107, and component builder 111. Interface builder 105 may receive a request from, for example, web interface 113A for generating interface 115A associated with data source 103A. Although some examples of this disclosure are discussed with respect to one interface associated with one data source, the embodiments of this disclosure are not limited to these examples. In some embodiments, an interface 115A can be generated for any number of data sources 103. Additionally or alternatively, one or more interfaces 115 can be associated to one or more data sources 103.

Interface builder 105 may receive the request for generating interface 115A when, for example, user 117A accesses design and integration system 101. After receiving the request to generate interface 115A, interface builder 105 may establish a connection with data source 103A to receive the data from data source 103A and to display the data on interface 115A. Additionally or alternatively, interface builder 105 can use the established connection to send parameters (e.g., control parameters) from interface 115A back to data source 103A. In other words, interface builder 105 may use the established connection to control data source 103A, according to some embodiments.

Interface builder 105 may also receive indication of one or more components 107 to be added to interface 115A. For example, interface builder 105 may receive the indication of the components 107 from user 117A through web interface 113A. In an embodiment, the components 107 may be graphical representation of operators that user 117A may desire to have in interface 115A. The operators may be used within a data flow (e.g., pipeline for example data flow 200 of FIG. 2A) for monitoring or manipulating the data from data source 103A. Components 107 may enable a user 117 to view, add, remove, or otherwise modify data values. As non-limiting examples, components 107 can include a text box, check box, a slider, a button (e.g., radio button), a knob, a visualization graph, a table, a spinner, a scrollbar, a tool or an icon, etc., that enables a user to view or modify a data value through keyboard, mouse, or voice instructions. Additionally or alternatively, components 107 can include graphical representation of operators that may function based on artificial intelligence and machine learning techniques and technologies. For example, components 107 can include graphical representation of operators that may function based on k-means clustering algorithms, support vector algorithms, apriori algorithm, liner regression, logistic regression, decision trees, random forests, artificial neural networks, nearest neighbor, etc.

According to some embodiments, user 117A may choose one or more components from components 107 in design and integration system 101. Components 107 may be previously designed and stored within design and integration system 101 (or may be accessible by design and integration system 101). User 117A may choose any number of components 107 to be added to interface 115A. Interface builder 105 may receive the indication of the chosen components 107, and may add them to interface 115A.

In some embodiments, each component 107 may have one or more features or parameters referred herein as component features 109. As a non-limiting example, component features 109 can include a description, a unit, a minimum value, a maximum value, a step size, etc., that a user can define for component 107. For example, component 107 can include a frequency slider and component features 109 can include a description (e.g., frequency), a unit (e.g., Hz), minimum and maximum values for the frequency slider, and a step size for the frequency slider. In an embodiment, interface builder 105 can receive parameters for component 107 from user 117A and determine component features 109 associated with component 107.

In addition to components 107, design and integration system 101 may include component builder 111, according to some embodiments. For example, if user 117A desires a particular operator and design and integration system 101 does not have its associated component (of the particular operator), then user 117A may generate that operator using component builder 111 and interface builder 105.

The generated interface 115A may be displayed on web interface 113A. Interface 115A includes one or more components 107 and has established connection with one or more data sources 103. According to an embodiment, the data from, for example, data source 103A can be displayed in real-time using one component 107 on interface 115A. Component 107 for displaying the data can include a visualization graph component. Additionally or alternatively, user 117 can use other components 107 on interface 115A to manipulate the data. For example, the other components 107 can include control components for changing parameters of the data and/or data source 103A.

Figure 2A:
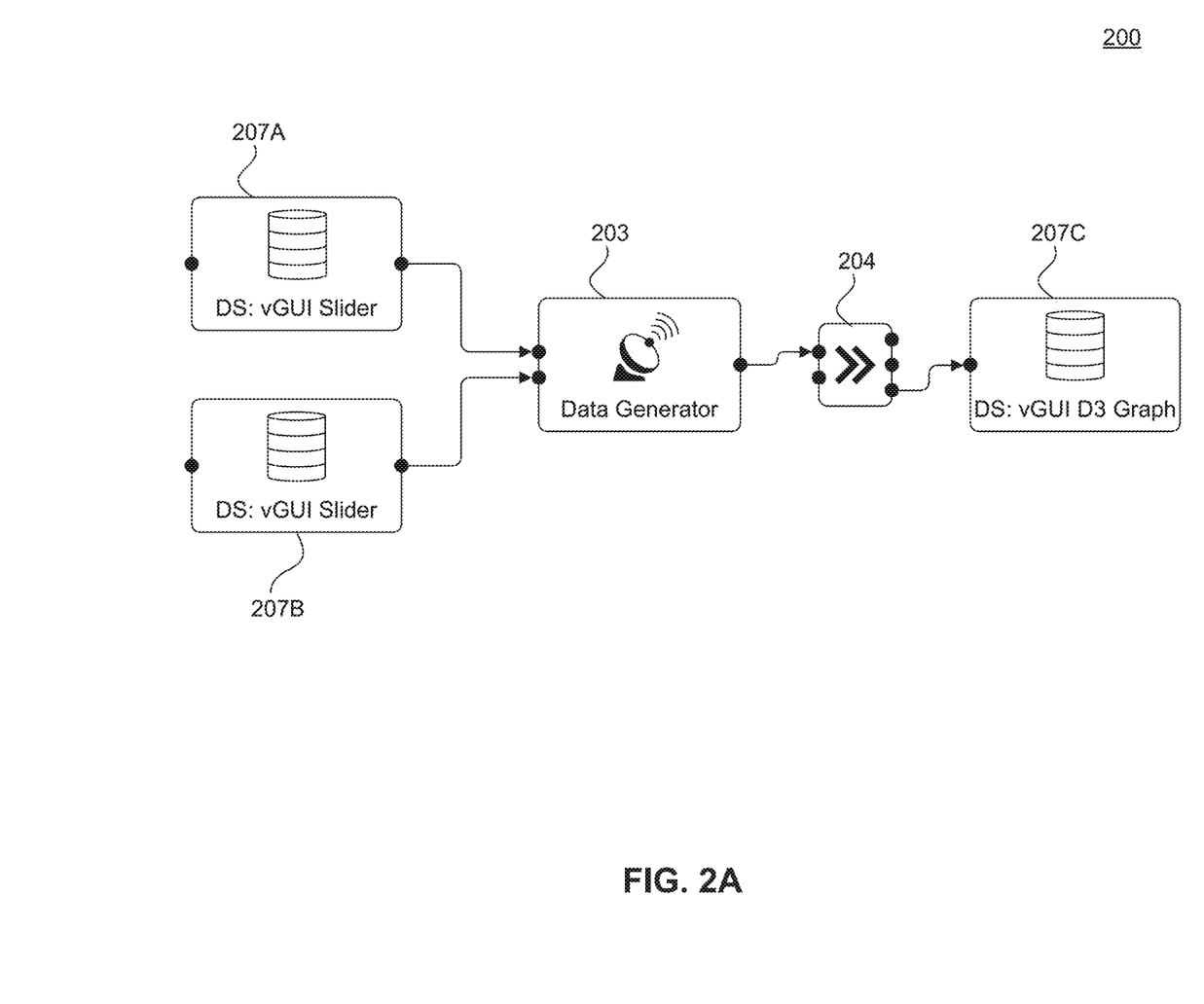
FIG. 2A is an example data flow and operational diagram for generating an example interface using a dashboard user interface design and integration system, according to some embodiments.

FIG. 2A is an example illustration of a data flow 200 used as a basis for generating an example interface using the dashboard user interface design and integration system, according to some embodiments.

In an embodiment, a user 117 may use design and integration system 101 to generate an interface 115 based on data flow 200. In other words, data flow 200 may be a backend representation for interface 115. Data flow 200 may include operators 207A-C. The operators may include, for example, two control operators 207A-B (e.g., sliders) and one visualization graph 207C. Data flow 200 may also include data generator 203 and conversion operator 204.

As illustrated in FIG. 2A, each element in data flow 200 can include one or more inputs and one or more outputs. Data flow 200 can be generated by coupling the respective input(s) and output(s) of corresponding elements. For example, the outputs of control operators 207A and 207B are coupled to inputs of data generator 203. The output of data generator 203 is coupled to input of graph operator 207C using, for example, conversion operator 204. According to some example, conversion operator 204 can be configured to receive data from data generator 203 and controls from operators 207A-B and convert them to a format compatible by graph operator 207C to be displayed.

According to some examples, interface builder 105 is configured to add (and/or generate and design) components 107 corresponding to operators 207A-207C to interface 115A on web interface 113A. Additionally, interface builder 105 is configured to establish a connection with, for example, data source 103A corresponding to data generator 203. Accordingly, interface builder 105 is configured to generate interface 115A based, at least in part, on data flow 200.

Figure 2B:
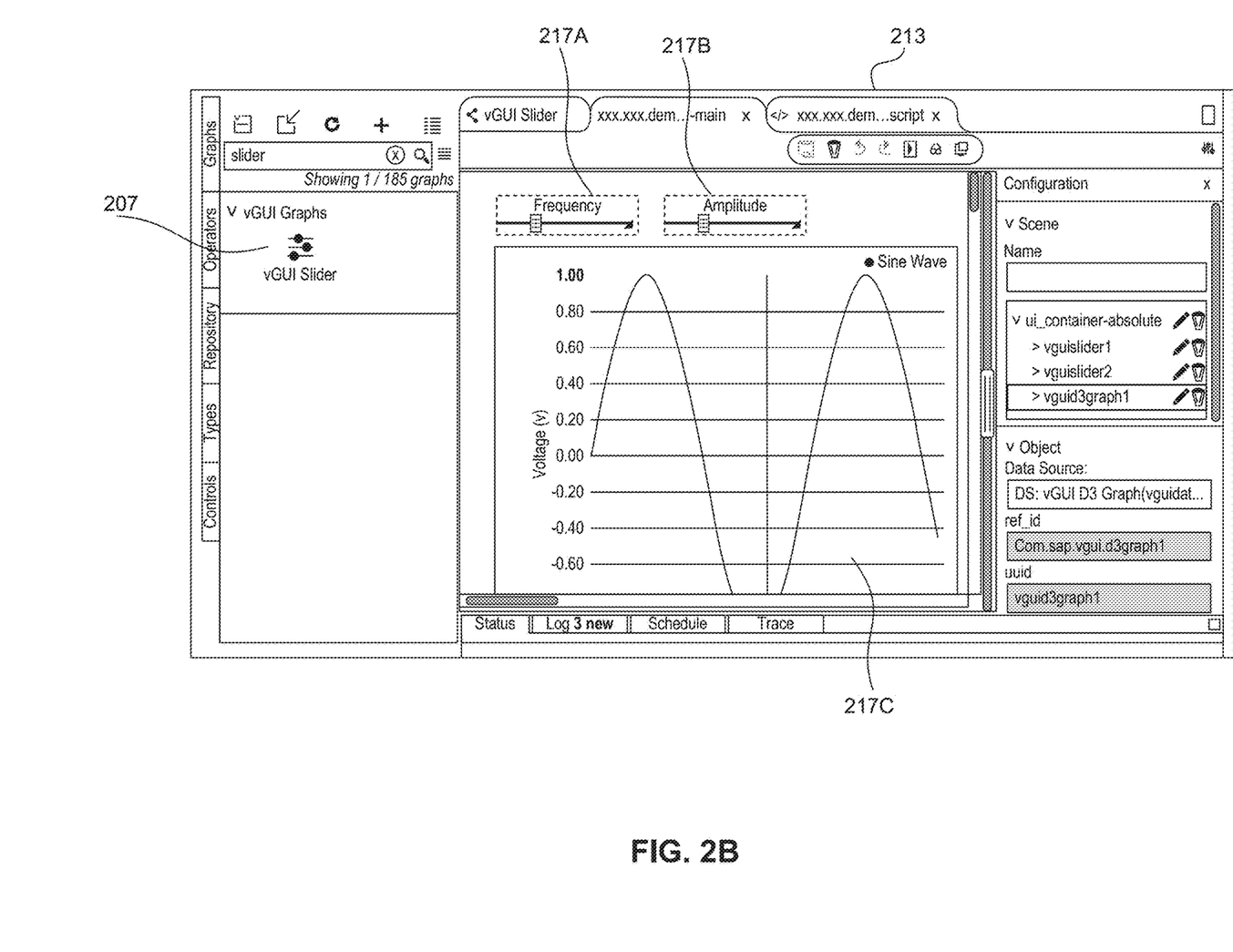
FIG. 2B is an example illustration of a web interface for accessing and using a dashboard user interface design and integration system to generate an interface, according to some embodiments.

FIG. 2B is an example illustration of a web interface for accessing and using the dashboard user interface design and integration system to generate an interface, according to some embodiments. Web interface 213 of FIG. 2B can include web interface 113 of FIG. 1. A user 117 can use web interface 213 to access and use design and integration system 101 to generate interface 115 of FIG. 1 or interface 215 of FIG. 2C.

Components 107 of design and integration system 101 are illustrated as components 207. Design and integration system 101 and interface builder 105 may enable a user or a programmer to drag-and-drop components 207 to generate interface 115 of FIG. 1 or interface 215 of FIG. 2C based on an underlying data flow 200 of FIG. 2A. As a non-liming example illustrated in FIG. 2B, a user or a programmer may drag-and-drop interface components 217A-217C from components 207 onto web interface 213 to generate interface 115 of FIG. 1 or interface 215 of FIG. 2C. In this example, interface component 217A can include a frequency slider, and interface component 217B may include an amplitude slider. Also, interface component 217C can include a visualization graph to display the data from, for example, data source 103A. Interface components 217A-B may enable a user to view and change or manipulate the data that is illustrated in interface component 217C.

Figure 2C:
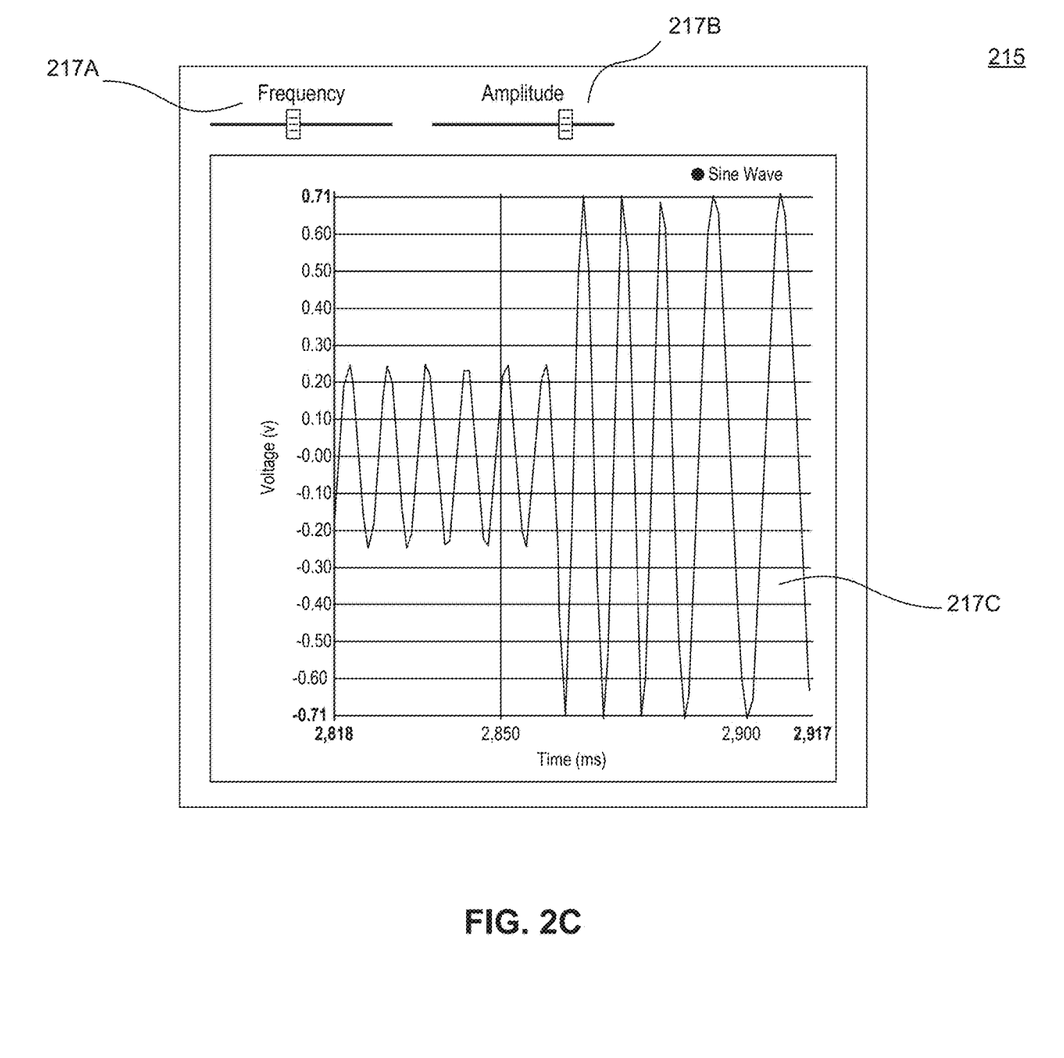
FIG. 2C is an example illustration of an interface generated using a dashboard user interface design and integration system, according to some embodiments.

FIG. 2C is an example illustration of an interface generated using the dashboard user interface design and integration system, according to some embodiments. Interface 215, which can include, for example, interface 115A of FIG. 1, is generated using interface builder 105 of design and integration system 101, as discussed above. Interface 215 may include interface components 217A-C. Interface 215 may enable a user to view and change or manipulate the data that is illustrated in interface component 217C. In an embodiment, changes to the data using either interface components 217A or 217B may be received by design and integration system 101 (e.g., interface builder 105) and may be communicated to data source 103A. Additionally or alternatively, changes to the data and/or data source 103A may be received by design and integration system 101 (e.g., interface builder 105) from, for example, data source 103A (and/or other interfaces 115) and may be communicated to interface components 217A-C of interface 215.

Figure 3A:
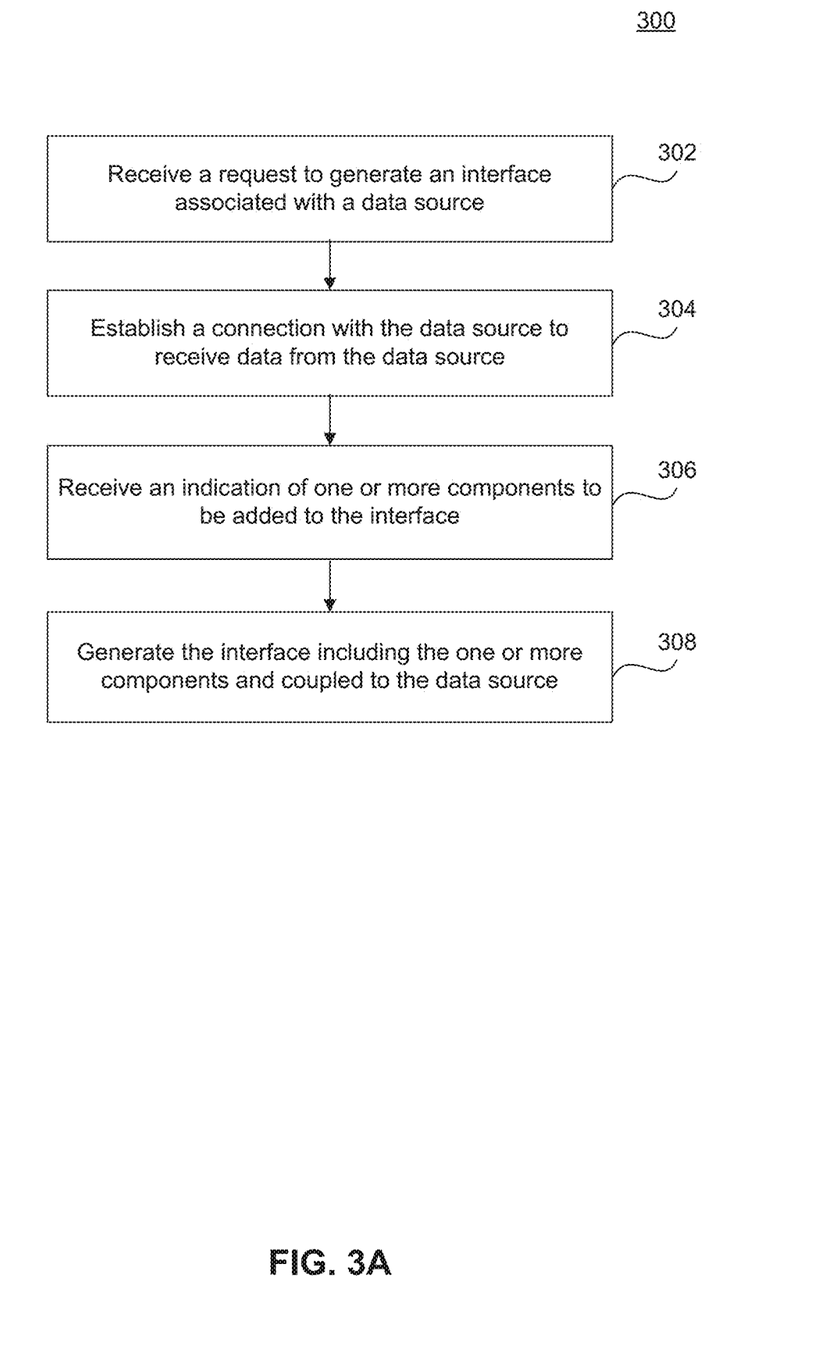
FIG. 3A is a flowchart illustrating example operations of a dashboard user interface design and integration system, according to some embodiments.

FIG. 3A is a flowchart 300 illustrating example operations of a dashboard user interface design and integration system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3A, as will be understood by a person of ordinary skill in the art. Method 300 shall be described with reference to FIGS. 1 and 2A-2C. However, method 300 is not limited to those example embodiments.

In 302, a request for generating an interface associated with a data source is received. For example, interface builder 105 may receive a request from user 117A through web interface 113A to generate interface 115A. In an embodiment, the generated interface 115A is associated with a data source such as, but not limited to, data source 103A. In this example, interface 115A enables user 117A to monitor or manipulate the data received from data source 103A. Additionally or alternatively, interface 115A enables user 117A to control data source 103A based on the monitored data. Interface 115, which may be specific to the user 117A's needs and requirements, may enable user 117A to access and use data from data source 103A that is local to user 117A or is provided in a remote or distributed manner with respect to user 117A.

In 304, a connection is established to the data source. For example, interface builder 105 may establish a connection with data source 103A such that interface builder 105 may receive the data from data source 103A for display and/or manipulation on interface 115A. It is noted that although some embodiments of this disclosure are discussed with one web interface, one interface, and one data source, the embodiments of this disclosure are not limited to these examples. Interface builder 105 may use one or more data sources 103 to generate one or more interfaces 115 to be accessed by one or more web interfaces 113. For example, interface builder 105 may establish one or more connections with one or more data source 103 when generating interface 115A. In this example, interface 115A can be accessed or displayed on one or more web interfaces 113.

In 306, an indication of one or more components to be added to the interface is received. For example, interface builder 105 may receive an indication of components 107. In an embodiment, user 117A, through web interface 113A, may access components 107 to drag-and-drop them on interface 115A.

In some embodiments, the received indication of the component may specify that the component to be added includes a visualization graph component. The visualization graph component can be used to display the data from the data source. Additionally or alternatively, the received indication of the component may specify that the component to be added includes a control component. The control component may be used for controlling the data source and/or manipulating the data from the data source.

In an embodiment, receiving the indication of components may include receiving one or more features or parameters associated with each component. For example, interface builder 105 may receive the parameters from user 117A through web interface 113A. Using the received parameters, interface builder 105 may adjust or determine component features 109 associated with each component 107.

In some examples, receiving the indication of components may include receiving a request for generating components. For example, if user 117A requests a component not available in component 107, user 117A may use component builder 111 to generate the requested component. In this example, interface builder 105 may receive the request from user 117A through web interface 113A. Interface builder 105 in combination with component builder 111 may generate the requested component and add the generated component to interface 115A.

In 308, the interface is generated, where the interface may include the components and the interface may be coupled to the data source to receive the data from the data source and/or send control parameters to the data source. For example, interface builder 105 may generate interface 115A and display interface 115A at web interface 113A. Interface 115A may include one or more components 107, may be coupled to data source 103A, and may enable user 117A to monitor and manipulate data from data source 103A.

Figure 3B:
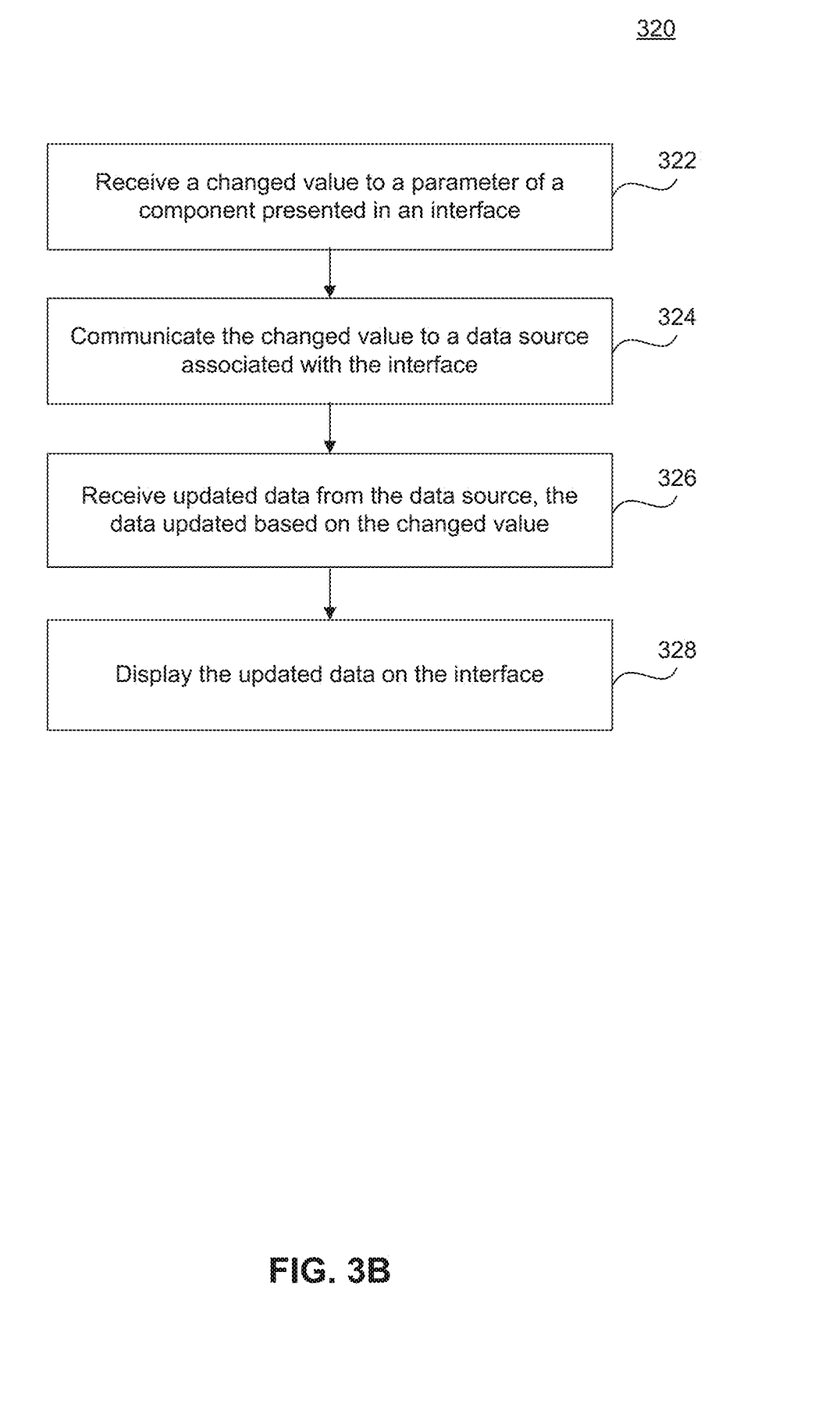
FIG. 3B is a flowchart illustrating example operations of an interface that was generated using a dashboard user interface design and integration system, according to some embodiments.

FIG. 3B is a flowchart 320 illustrating example operations of an interface that was generated using a dashboard user interface design and integration system, according to some embodiments. Method 320 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3B, as will be understood by a person of ordinary skill in the art. Method 320 shall be described with reference to FIGS. 1 and 2A-2C. However, method 320 is not limited to those example embodiments.

Method 320 illustrates one exemplary use of an interface that is generated using the dashboard user interface design and integration system of this disclosure. In this exemplary method, when a parameter of a component presented in an interface (e.g., interface 115A) is changed (e.g., by user 117A), the changed value of the parameter may be communicated to the data source (e.g., data source 103A) associated with the interface. The data source may generate updated data based on the changed value of the parameter. The updated data may be displayed by the interface. According to some embodiments, the user, using method 320, may in real-time (or substantially real-time) change parameters of the data source and monitor the changes in data.

In some embodiments, interface 115A may directly communicate with data source 103A to send the changed value of the parameter and receive the updated data. Additionally or alternatively, interface 115A may communicate with data source 103A through design and integration system 101 (e.g., using interface builder 105) to send the changed value of the parameter and receive the updated data.

In 322, a changed value to a parameter of a component presented in the interface (e.g., interface 115A) is received. For example, interface 115A alone or in combination with interface builder 105 receives the changed value.

In 324, the changed value is communicated to the data source (e.g., data source 103A) associated with the interface. For example, interface 115A alone or in combination with interface builder 105 communicates the changed value to the data source. In some embodiments, 324 can further include determining the data source associated with the interface and/or the component, which its parameter is changed. For example, interface builder 105 or design and integration system 101 can include (or have access to) a database or memory for storing the connections between the interfaces and their associated data sources. Using, this memory and database, the interface can determine its associated data source and communicate the changed value to it.

As a non-limiting example, the data source may include a filter and the component may be a frequency slider configured to adjust the frequency of the filter. When a user changes the value of the frequency on the frequency slider, interface 115A alone or in combination with interface builder 105 communicates the changed frequency to the filter of the data source. The data source, using the changed frequency, generates updated data, which can be displayed on the interface.

In 326, the updated data is received from the data source, where the data is updated based on the changed value of the parameter of the component. For example, interface 115A alone or in combination with interface builder 105 receives the updated data.

In 328, the updated data is displayed on the interface. In one example, if interface builder 105 receives the updated data, interface builder 105 provides the updated data to the interface for display. Additionally or alternatively, if the interface 115A directly receives the updated data from the data source, interface 115A may display the updated data.

Although the embodiments of FIG. 3B are discussed herein as changing a parameter of a data source using the interface and displaying the updated data based on the changed parameters, these embodiments can also extend to using the interface to change the data of the data source and displaying the updated data.

Figure 4:
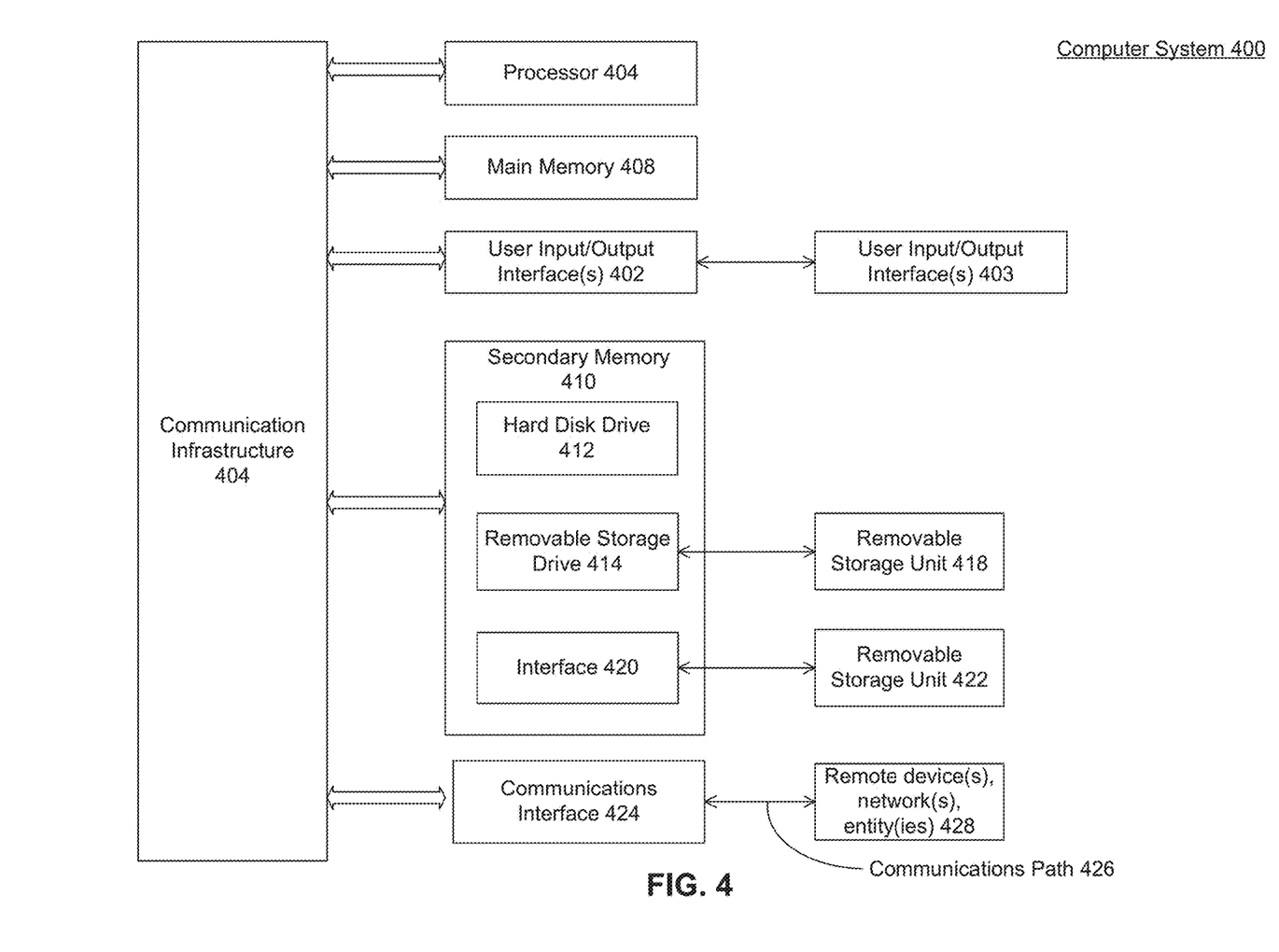
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a request to generate an interface associated with a data source;
establishing a connection with the data source to receive data from the data source;
receiving a first indication of a first component to be displayed on the interface;
receiving a second indication of a second component to be displayed on the interface;
arranging the first component, the second component, and the connection with the data source in a data flow on a display of an interface builder in response to receiving the second indication of the second component, wherein the arranging comprises:
coupling an output of the data source to an input of the first component; and
coupling an output of the second component to an input of the data source;
receiving one or more parameters for the second component;
determining one or more component features for the second component based on the received one or more parameters; and
generating the interface from the arranged data flow, wherein the interface displays the first component and the second component having the one or more component features, and the interface is configured to manipulate the data source through the arranged data flow using the displayed second component.

2. The method of claim 1, wherein the first component comprises a visualization graph configured to display the data received from the data source on the interface.

3. The method of claim 1, wherein:
the first component comprises a visualization graph configured to display the data received from the data source on the interface,
the second component comprises a control component configured to change the data from the data source or control the data source, and the one or more component features comprise at least one of a description, a unit, a maximum value, a minimum value, or a step size associated with the second component.

4. The method of claim 1, further comprising:
receiving a third indication of a third component to be generated and displayed on the interface;
generating the third component; and
adding the third component to the interface.

5. The method of claim 1, further comprising:
receiving a changed value of the one or more parameters of the second component;
determining the data source associated with the second component; and
communicating the changed value of the one or more parameters to the data source.

6. The method of claim 5, further comprising:
receiving updated data from the data source, wherein the updated data comprises the data updated based on the changed value of the one or more parameters; and
displaying the updated data using the second component.

7. The method of claim 5, wherein the interface is associated with a plurality of data sources and the communicating the changed value of the one or more parameters comprises communicating the changed value to the plurality of data sources.

8. The method of claim 1, wherein:
the interface is associated with a plurality of data sources,
the first component comprises a visualization graph configured to display the data received from the plurality of data sources on the interface, and
the second component comprises a control component configured to control one or more of the plurality of data sources.

9. The method of claim 1, wherein the second indication comprises a drag-and-drop for selecting and adding the second component to the interface.

10. A system, comprising:
a memory; and
at least one processor coupled to the memory and configured to:
receive a request to generate an interface associated with a data source;
establish a connection with the data source to receive data from the data source;
receive a first indication of a first component to be displayed on the interface;
receive a second indication of a second component to be displayed on the interface;
arrange the first component, the second component, and the connection with the data source in a data flow on a display of an interface builder in response to receiving the second indication of the second component, wherein to arrange the first component, the second component, and the connection with the data source in the data flow, the at least one processor is further configured to:
couple an output of the data source to an input of the first component; and
couple an output of the second component to an input of the data source;
receive one or more parameters for the second component;
determine one or more component features for the second component based on the received one or more parameters; and
generate the interface from the arranged data flow, wherein the interface displays the first component and the second component having the one or more component features, and the interface is configured to manipulate the data source through the arranged data flow using the displayed second component.

11. The system of claim 10, wherein:
the first component comprises a visualization graph configured to display the data received from the data source on the interface,
the second component comprises a control component configured to change the data from the data source or control the data source, and
the one or more component features comprise at least one of a description, a unit, a maximum value, a minimum value, or a step size associated with the second component.

12. The system of claim 10, wherein the at least one processor is further configured to:
receive a third indication of a third component to be generated and displayed on the interface;
generate the third component; and
add the third component to the interface.

13. The system of claim 10, wherein the at least one processor is further configured to:
receive a changed value of the one or more parameters of the second component;
determine the data source associated with the second component; and
communicate the changed value of the one or more parameters to the data source.

14. The system of claim 13, wherein the at least one processor is further configured to:
receive updated data from the data source, rein the updated data comprises the data updated based on the changed value of the one or more parameters; and
display the updated data using the second component.

15. A non-transitory computer-readable device having instructions stored thereon that, when executed by at least one computing device, cause the at least one computing device to perform operations comprising:
receiving a request to generate an interface associated with a data source;
establishing a connection with the data source to receive data from the data source;
receiving a first indication of a first component to be displayed on the interface;
receiving a second indication of a second component to be displayed on the interface;
arranging the first component, the second component, and the connection with the data source in a data flow on a display of an interface builder in response to receiving the second indication of the second component, wherein the arranging comprises:
coupling an output of the data source to an input of the first component; and
coupling an output of the second component to an input of the data source;
receiving one or more parameters for the second component;
determining one or more component features for the second component based on the received one or more parameters; and generating the interface from the arranged data flow, wherein the interface displays the first component and the second component having the one or more component features, and the interface is configured to manipulate the data source through the arranged data flow using the displayed the second component.

16. The non-transitory computer-readable device of claim 15, wherein the first component comprises a visualization graph configured to display the data received from the data source on the interface.

17. The non-transitory computer-readable device of claim 15, wherein:
the first component comprises a visualization graph configured to display the data received from the data source on the interface,
the second component comprises a control component configured to change the data from the data source or control the data source, and
the one or more component features comprise at least one of a description, a unit, a maximum value, a minimum value, or a step size associated with the second component.

18. The non-transitory computer-readable device of claim 15, the operations further comprising:
receiving a third indication of a third component to be generated and displayed on the interface;
generating the third component; and
adding the third component to the interface.

19. The non-transitory computer-readable device of claim 15, the operations further comprising:
receiving a changed value of the one or more parameters of the second component;
determining the data source associated with the second component; and
communicating the changed value of the one or more parameters to the data source.

20. The non-transitory computer-readable device of claim 19, the operations further comprising:
receiving updated data from the data source, wherein the updated data comprises the data updated based on the changed value of the one or more parameters; and
displaying the updated data using the second component.

* * * * *